(12) United States Patent
Olivier et al.

(10) Patent No.: US 11,915,456 B2
(45) Date of Patent: Feb. 27, 2024

(54) METHOD AND DEVICE FOR ENCODING AND RECONSTRUCTING MISSING POINTS OF A POINT CLOUD

(71) Applicant: InterDigital VC Holdings, Inc., Wilmington, DE (US)

(72) Inventors: Yannick Olivier, Thorigne-Fouillard (FR); Jean-Claude Chevet, Betton (FR); Joan Llach, London (GB)

(73) Assignee: INTERDIGITAL VC HOLDINGS, INC., Wilmington, DE (US)

( * ) Notice: Subject to any disclaimer, the term of this patent is extended or adjusted under 35 U.S.C. 154(b) by 353 days.

(21) Appl. No.: 17/282,555

(22) PCT Filed: Oct. 4, 2019

(86) PCT No.: PCT/US2019/054637
§ 371 (c)(1),
(2) Date: Apr. 2, 2021

(87) PCT Pub. No.: WO2020/072865
PCT Pub. Date: Apr. 9, 2020

(65) Prior Publication Data
US 2021/0383576 A1   Dec. 9, 2021

(30) Foreign Application Priority Data

Oct. 5, 2018   (EP) ...................................... 18306318
Mar. 14, 2019   (EP) ...................................... 19305307

(51) Int. Cl.
*G06T 9/00*   (2006.01)
*G06T 7/10*   (2017.01)

(52) U.S. Cl.
CPC ................ *G06T 9/001* (2013.01); *G06T 7/10* (2017.01); *G06T 2207/20021* (2013.01)

(58) Field of Classification Search
CPC .. G06T 9/001; G06T 7/10; G06T 2207/20021
See application file for complete search history.

(56) References Cited

U.S. PATENT DOCUMENTS 11,200,703 B2   12/2021   Kato et al.
2014/0303944 A1*   10/2014   Jiang ...................... G06T 9/001
                                                                        703/1

(Continued)

FOREIGN PATENT DOCUMENTS

WO   2017126314 A1   7/2017
WO   2017209961 A1   12/2017

(Continued)

OTHER PUBLICATIONS

Huang, Yan, et al. "A generic scheme for progressive point cloud coding." IEEE Transactions on Visualization and Computer Graphics 14.2 (2008): 440-453. (Year: 2008).*

(Continued)

*Primary Examiner* — Utpal D Shah
(74) *Attorney, Agent, or Firm* — Volpe Koenig (57) ABSTRACT

A method and apparatus of encoding/decoding attributes of points of a pint cloud are provided. The encoding method subdivides a bounding box bounding the points to be encoded, encodes data representative of attributes of a point by referring to a subdivision to which said point belongs to; and encode data representative of a number of points comprised in each subdivision.

18 Claims, 7 Drawing Sheets

(56) References Cited

U.S. PATENT DOCUMENTS

2017/0347055 A1 11/2017 Dore et al.
2018/0286107 A1 10/2018 Hemmer et al.

FOREIGN PATENT DOCUMENTS

WO 2018114417 A1 6/2018
WO 2019069711 A1 4/2019

OTHER PUBLICATIONS

Schnabel, Ruwen, and Reinhard Klein. "Octree-based Point-Cloud Compression." Pbg@ SIGGRAPH 3 (2006). (Year: 2008).*
Anonymous, "Information Technology—Digital Compression and Coding of Continuous-Tone Still Images—Requirements and Guidelines", International Telegraph and Telephone Consultative Committee (CCITT), Terminal Equipment and Protocols for Telematic Services, Recommendation T.81, Sep. 1992, 186 pages.
Olivier et al, "PCC Multiple Missing Point Patches for TMC2", International Organization for Standardization ISO/IEC JTC1/SC29/WG11, Coding of Moving Pictures and Audio, Document: MPEG2018/m44802, 124th Meeting, Oct. 2018, Macao, China, 4 pages.
Anonymous, "High Efficiency Video Coding", Telecommunication Standardization Sector of ITU, Series H: Audiovisual and Multimedia Systems, Infrastructure of Audiovisual Services—Coding of Moving Video, Recommendation ITU-T H.265 Standard, Dec. 2016, 664 pages.
Sinharoy et al, "PCC TMC2 CE2.4 Lossless Compression", International Organization for Standardization ISO/IEC JTC1/SC29/WG11, Coding of Moving Pictures and Audio, Document: MPEG2018/m42680, Apr. 2018, San Diego, CA, United States, 8 pages.
Zakharchenko et al, "Algorithm description of mpeg-pcc-tmc2 (v-pcc)", International Organization for Standardization ISO/IEC JTC1/SC29/WG11, Coding of Moving Pictures and Audio, Document: MPEG2018/N17767, Ljubljana, Slovenia, Jul. 2018, 25 pages.
Im et al, "A Method of 3D Grid Representation for Spatial Random Access in V-PCC", International Organization for Standardization ISO/IEC JTC1/SC29/WG11, Coding of Moving Pictures and Audio, Document: MPEG2018/m44975, Oct. 2018, Macau, China, 4 pages.
Anonymous, "Series H: Audiovisual and Multimedia Systems, Infrastructure of audiovisual services—Coding of moving video—Conformance Specification for ITU-T H.265 High Efficiency Video Coding", International Telecommunication Union, ITU-T Telecommunication Standardization Sector of ITU, Recommendation ITU-T H.265.1, Oct. 2014, 42 pages.
Mekuria et al, "Design Implementation, and Evaluation of a Point Cloud Codec for Tele-Immersive Video", IEEE Transactions on Circuits and Systems for Video Technology, vol. 27, No. 4, Apr. 2017, 15 pages.
Sinharoy et al., "Lossless Coding in TMC2", International Organization for Standardization, ISO/IEC JTC1/SC29/ WG11, Coding of Moving Picture and Audio, Document MPEG2018/m42170, Gwangju, Korea, Jan. 2018, 10 pages.
Anonymous, "Series H: Audiovisual and Multimedia Systems, Infrastructure of audiovisual services—Coding of moving video—Advanced video coding for generic audiovisual services", International Telecommunication Union, ITU-T Telecommunication Standardization Sector of ITU, Recommendation ITU-T H.264, Jun. 2019, 836 pages.
Schwarz et al., "2D Video Coding of Volumetric Video Data", 2018 Picture Coding Symposium (PCS), San Francisco, CA, United States, Jun. 24, 2018, 5 pages.

* cited by examiner

| group_of_frames_auxiliary_information( ) { | Descriptor |
|---|---|
| patch_count | u(32) |
| mps_patch_count | u(32) |
| occupancy_precision | u(8) |
| max_candidate_Count | u(8) |
| bit_count_u0 | u(8) |
| bit_count_v0 | u(8) |
| bit_count_u1 | u(8) |
| bit_count_v1 | u(8) |
| bit_count_d1 | u(8) |
| occupancy_aux_stream_size | u(32) |
| ByteCount += 15 | |
| for( i = 0; i < mps_patch_count; i++ ) { | |
| num_of_mps[i] | u(32) |
| } | |
| for( i = 0; i < patch_count; i++ ) { | |
| patchList[i].patch_u0 | ae(v) |
| patchList[i].patch_v0 | ae(v) |
| patchList[i].patch_u1 | ae(v) |
| patchList[i].patch_v1 | ae(v) |
| patchList[i].patch_d1 | ae(v) |
| patchList[i].delta_size_u0 | se(v) |
| patchList[i].delta_size_v0 | se(v) |
| } | |
| } | |
| ... | |

Fig. 5

| group_of_frames_auxiliary_information( ) { | Descriptor |
|---|---|
| patch_count | u(32) |
| mps_patch_count | u(32) |
| occupancy_precision | u(8) |
| max_candidate_Count | u(8) |
| bit_count_u0 | u(8) |
| bit_count_v0 | u(8) |
| bit_count_u1 | u(8) |
| bit_count_v1 | u(8) |
| bit_count_d1 | u(8) |
| bit_count_mps_u1 | u(8) |
| bit_count_mps_v1 | u(8) |
| bit_count_mps_d1 | u(8) |
| mps_resolution | u(8) |
| occupancy_aux_stream_size | u(32) |
| ByteCount += 15 | |
| for( i = 0; i < patch_count; i++ ) { | |
| patchList[i].patch_u0 | ae(v) |
| patchList[i].patch_v0 | ae(v) |
| patchList[i].patch_u1 | ae(v) |
| patchList[i].patch_v1 | ae(v) |
| patchList[i].patch_d1 | ae(v) |
| patchList[i].delta_size_u0 | se(v) |
| patchList[i].delta_size_v0 | se(v) |
| } | |
| } | |
| for( i = 0; i < mps_patch_count; i++ ) { | |
| mpsPatchList[i].patch_u0 | ae(v) |
| mpsPatchList[i].patch_v0 | ae(v) |
| mpsPatchList[i].patch_u1 | ae(v) |
| mpsPatchList[i].patch_v1 | ae(v) |
| mpsPatchList[i].patch_d1 | ae(v) |
| mpsPatchList[i].delta_size_u0 | se(v) |
| mpsPatchList[i].delta_size_v0 | se(v) |
| mpsPatchList[i].num_of_mps | se(v) |
| } | |
| ... | |

Fig. 6

| sequence_parameter_set( ) { | Descriptor |
|---|---|
| ... | |
| sps_pcm_patch_enabled_flag | u(1) |
| if( sps_pcm_patch_enabled_flag ) | |
| sps_pcm_patch_separate_video_present_flag | u(1) |
| sps_pcm_relative_3D_offset_flag | u(1) |
| occupancy_parameter_set( ) | |
| ... | |
| } | |

Fig. 7

| patch_frame_data_unit( frmIdx ) { | Descriptor |
|---|---|
| pfdu_patch_count_minus1 | u(32) |
| if( pfh_type[ frmIdx ] != I ) | |
| pfdu_inter_patch_count | ae(v) |
| else | |
| pfdu_inter_patch_count = 0 | |
| for( p = 0; p < pfdu_inter_patch_count; p++ ) { | |
| pfdu_patch_mode[ frmIdx ][ p ] = P_INTER | |
| patch_information_data( frmIdx, p, pfdu_patch_mode[ frmIdx ][ p ] ) | |
| } | |
| for( p = pfdu_inter_patch_count; p <= pfdu_patch_count_minus1; p++ ) { | |
| pfdu_patch_mode[ frmIdx ][ p ] = pfh_type[ frmIdx ] == I ? I_INTRA : P_INTRA | |
| patch_information_data( frmIdx, p, pfdu_patch_mode[ frmIdx ][ p ] ) | |
| } | |
| PfduTotalNumberOfPatches[ frmIdx ] = p | |
| if( sps_pcm_patch_enabled_flag ) { | |
| pfdu_pcm_patch_count_minus1 | u(32) |
| for( p = pfdu_patch_count_minus1+1;     p <= pfdu_patch_count_minus1+1 + pfdu_pcm_patch_count_minus1;     p++ ) { | |
| pfdu_patch_mode[ frmIdx ][ p ] = pfh_type[ frmIdx ] == I ? I_PCM : P_PCM | |
| patch_information_data( frmIdx, p, pfdu_patch_mode[ frmIdx ][ p ] ) | |
| PfduTotalNumberOfPatches[ frmIdx ]++ | |
| } | |
| if( sps_point_local_reconstruction_enabled_flag ) | |
| point_local_reconstruction( ) | |
| byte_alignment( ) | |
| } | |

Fig. 8

| pcm_patch_data_unit( frmIdx, patchIndex ) { | Descriptor |
|---|---|
| if(sps_pcm_separate_video_flag ) | |
| ppdu_patch_in_pcm_video_flag[ frmIdx ][ p ] | ae(v) |
| ppdu_2d_shift_u[ frmIdx ][ p ] | ae(v) |
| ppdu_2d_shift_v[ frmIdx ][ p ] | ae(v) |
| ppdu_2d_delta_size_u[ frmIdx ][ p ] | ae(v) |
| ppdu_2d_delta_size_v[ frmIdx ][ p ] | ae(v) |
| ppdu_pcm_points[ frmIdx ][ p ] | ae(v) |
| } | |

Fig. 9

| pcm_patch_data_unit( frmIdx, patchIndex ) { | Descriptor |
|---|---|
| if(sps_pcm_separate_video_flag ) | |
| ppdu_patch_in_pcm_video_flag[ frmIdx ][ patchIndex ] | ae(v) |
| if(!ppdu_patch_in_pcm_video_flag[ frmIdx ][ patchIndex ]){ | |
| ppdu_2d_shift_u[ frmIdx ][ patchIndex ] | ae(v) |
| ppdu_2d_shift_v[ frmIdx ][ patchIndex ] | ae(v) |
| ppdu_2d_delta_size_u[ frmIdx ][ p ] | |
| ppdu_2d_delta_size_v[ frmIdx ][ p ] | |
| } | |
| if(sps_pcm_relative_3D_offset_flag){ | |
| dpdu_3d_relative_shift_index[ frmIdx ][ patchIndex ] | ae(v) |
| } | |
| else { | |
| dpdu_3d_pcm_shift_tangent_axis[ frmIdx ][ patchIndex ] | ae(v) |
| dpdu_3d_pcm_shift_bitangent_axis[ frmIdx ][ patchIndex ] | ae(v) |
| dpdu_3d_pcm_shift_normal_axis[ frmIdx ][ patchIndex ] | ae(v) |
| } | |
| ppdu_pcm_points[ frmIdx ][ patchIndex ] | ae(v) |
| } | |

METHOD AND DEVICE FOR ENCODING AND RECONSTRUCTING MISSING POINTS OF A POINT CLOUD

This application claims the benefit, under 35 U.S.C. § 371 of International Application PCT/US2019/054637, filed Oct. 4, 2019, which was published in accordance with PCT Article 21(2) on Apr. 9, 2020, in English, and which claims the benefit of European Patent Application No. 19305307.1, filed Mar. 14, 2019.

FIELD

The present embodiments generally relate to coding and reconstructing of points of a point cloud. Particularly, but not exclusively, the technical field of the present embodiments are related to encoding/reconstructing of a point cloud representing the external surface of a 3D object.

BACKGROUND

The present section is intended to introduce the reader to various aspects of art, which may be related to various aspects of the present embodiments that are described and/or claimed below. This discussion is believed to be helpful in providing the reader with background information to facilitate a better understanding of the various aspects of the present embodiments. Accordingly, it should be understood that these statements are to be read in this light, and not as admissions of prior art.

A point cloud is a set of points (data points) in some coordinate system. In a three-dimensional coordinate system (3D space), these points are usually intended to represent the external surface of a 3D object. Each point of a point cloud is often defined by its location (X, Y, and Z coordinates in the 3D space) and possibly by other associated attributes such as a color, represented in the RGB or YUV color space for example, a transparency, a reflectance, a two-component normal vector, etc.

It is usual to represent a point cloud as a set of 6-components points (X, Y, Z, R, G, B) or equivalently (X, Y, Z, Y, U, V) where (X,Y,Z) defines the coordinates of a colored point in a 3D space and (R,G,B) or (Y,U,V) defines a color of this colored point.

Point clouds may be static or dynamic depending on whether or not the cloud evolves with respect to time. It should be noticed that in case of a dynamic point cloud, the number of points is not constant but, on the contrary, generally evolves with time. A dynamic point cloud is thus a time-ordered list of set of points.

Practically, point clouds may be used for various purposes such as culture heritage/buildings in which objects like statues or buildings are scanned in 3D in order to share the spatial configuration of the object without sending or visiting it. Also, it is a way to ensure preserving the knowledge of the object in case it may be destroyed; for instance, a temple by an earthquake. Such point clouds are typically static, colored and huge.

Another use case is in topography and cartography in which using 3D representations, maps are not limited to the plane and may include the relief. Google Maps is now a good example of 3D maps but uses meshes instead of point clouds. Nevertheless, point clouds may be a suitable data format for 3D maps and such point clouds are typically static, colored and huge.

Automotive industry and autonomous car are also domains in which point clouds may be used. Autonomous cars should be able to "probe" their environment to take good driving decision based on the reality of their immediate neighboring. Typical sensors like LIDARs produce dynamic point clouds that are used by the decision engine. These point clouds are not intended to be viewed by a human being and they are typically small, not necessarily colored, and dynamic with a high frequency of capture. They may have other attributes like the reflectance provided by the Lidar as this attribute is a good information on the material of the sensed object and may help the decision.

Virtual Reality and immersive worlds have become a hot topic recently and foreseen by many as the future of 2D flat video. The basic idea is to immerse the viewer in an environment all round him by opposition to standard TV where he can only look at the virtual world in front of him. There are several gradations in the immersivity depending on the freedom of the viewer in the environment. Colored point cloud is a good format candidate to distribute Virtual Reality (or VR) worlds. They may be static or dynamic and are typically of averaged size, say no more than millions of points at a time.

Point cloud compression will succeed in storing/transmitting 3D objects for immersive worlds only if the size of the bitstream is low enough to allow a practical storage/transmission to the end-user.

It is crucial to be able to distribute dynamic point clouds to the end-user with a reasonable consumption of bit-rate while maintaining an acceptable (or preferably very good) quality of experience. Efficient compression of these dynamic point clouds is a key point in order to make the distribution chain of immersive worlds practical.

Image-based point cloud compression techniques are becoming increasingly popular due to their combination of compression efficiency and low complexity. They proceed in two main steps: first, they project (orthogonal projection) the point cloud, i.e. the points, onto 2D images that represents attributes associated with points of the point cloud. For example, at least one geometry image represents the geometry of the point cloud, i.e. the spatial coordinates of the points in a 3D space and at least one attribute image represents another attribute associated with the points of the point cloud, e.g. a texture/color information associated to those points. Next, these techniques encode such depth and attribute images with legacy video encoders.

Image-based point cloud compression techniques achieve good compression performance by leveraging the performance of 2D video encoder, like for example HEVC ("*ITU-T H.265 Telecommunication standardization sector of ITU (October/*2014), *series H: audiovisual and multimedia systems, infrastructure of audiovisual services—coding of moving video, High efficiency video coding, Recommendation ITU-T H.*265"), while at the same time, they keep complexity low by using simple projection schemes.

One of the challenges of image-based point cloud compression techniques is that a point cloud may not be suitable for projection onto images, especially when the point distribution follows a surface with many folds (concave/convex regions, like in clothing) or when the point distribution does not follow a surface at all (like in fur or hair). In these situations, image-based point cloud compression techniques suffer from low compression efficiency (many small projections are required, reducing the efficiency of the 2D video compression) or bad quality (due to the difficulty of projecting the point cloud onto a surface).

One of the approaches used in the state of the art to alleviate this problem consists in projecting multiple geometry and texture information onto a same spatial location (pixel) of an image. This means that several geometry and/or attribute images may be generated per point of the point cloud.

This is the case, for example, of the so-called Test Model Category 2 point cloud encoder (TMC2), as defined in ISO/IEC JTC1/SC29/WG11 MPEG2018/N17767, Ljubljana, July 2018.

In TMC2, a point cloud is orthogonally projected onto a projection plane. Two depth values are then associated per coordinate of said projection plane: one representative of the depth value associated with the nearest point (smallest depth value) and another representative of the depth value of the farthest point (largest depth value). A first geometry image is then generated from the smallest depth values (D0) and a second geometry image is generated from the absolute value of the largest depth values (D1) with D1-D0 lower than or equal to a maximum surface thickness. A first and second attribute images are also generated in association with the first (D0) and second (D1) geometry images. Both the attribute and geometry images are then encoded and decoded using any legacy video codec such as HEVC. The geometry of the point cloud is thus reconstructed by deprojection said decoded first and second geometry images and other attribute associated with points of the reconstructed point cloud are obtained from decoded attribute images.

SUMMARY

The following presents a simplified summary of the present embodiments in order to provide a basic understanding of some aspects of the present embodiments. This summary is not an extensive overview of the present embodiments. It is not intended to identify key or critical elements of the present embodiments. The following summary merely presents some aspects of the present embodiments in a simplified form as a prelude to the more detailed description provided below.

The present embodiments set out to remedy at least one of the drawbacks of the prior art with a method comprising:
 subdividing a bounding box bounding points of a point cloud into multiple subdivisions;
 encoding data representative of attributes of a point by referring to a subdivision to which said point belongs to; and
 encoding data representative of a number of points comprised in each subdivision.

According to an embodiment, the method further comprises obtaining a single 2D patch comprising data representative of the attributes of said points.

According to an embodiment, the method further comprises obtaining a 2D patch for a subdivision when said subdivision comprises at least one of said points.

According to an embodiment, the subdivision of said bounding box depending on a bit depth of an encoder used to encode the points.

According to an embodiment, wherein attribute of a point corresponds to the geometry or texture/color information of said point.

According to an embodiment, the points are obtained by comparing points of an input point cloud and points of a reconstructed point cloud, said reconstructed point cloud being obtained by:
 obtaining at least one geometry and attribute image by projection of at some points of the input point cloud onto a projection plane;
 encoding said at least one geometry and attribute images; and reconstructing points of the reconstructed point cloud by decoding said at least one geometry and attribute image.

According to another of their aspects, at least one of the present embodiments relate to a method comprising:
 decoding data representative of attributes of points of a point cloud by referring to a subdivision to which the points belong to, said subdivision being one of a plurality of subdivisions obtained by splitting a bounding box bounding said points of the point cloud; and
 decoding data representative of a number of points comprised in each subdivision of said bounding box; and
 reconstructing attributes of points from said decoded data.

According to an embodiment, attributes of points are reconstructed from said decoded data reconstructing points of the reconstructed point cloud by decoding at least one geometry and attribute image.

According to an embodiment, reconstructing attributes of points further comprises obtaining a 2D patch for a subdivision from a decoded geometry image, and obtaining the 3D coordinates of a point from the coordinates obtained from pixel values the 2D patch and the coordinates of a reference point of this 2D patch.

According to an embodiment, the method further comprises obtaining a 2D patch for a subdivision when said subdivision comprises at least one of said points.

According to an embodiment, the subdivision of said bounding box depending on a bit depth of a decoder used to decode the points.

According to an embodiment, attribute of a point corresponds to the geometry or texture/color information of said point.

According to other of their aspects, the present embodiments relate to apparatus, bitstream, computer program product, and non-transitory readable medium.

The specific nature of the present embodiments as well as other objects, advantages, features and uses of the present embodiments will become evident from the following description of examples taken in conjunction with the accompanying drawings.

BRIEF DESCRIPTION OF DRAWINGS

In the drawings, examples of the present embodiments are illustrated. It shows.

Similar or same elements are referenced with the same reference numbers.

DESCRIPTION OF EXAMPLE OF THE PRESENT EMBODIMENTS

The present embodiments will be described more fully hereinafter with reference to the accompanying figures, in which examples of the present embodiments are shown. The present embodiments may, however, be embodied in many alternate forms and should not be construed as limited to the examples set forth herein. Accordingly, while the present embodiments are susceptible to various modifications and alternative forms, specific examples thereof are shown by way of examples in the drawings and will herein be described in detail. It should be understood, however, that there is no intent to limit the present embodiments to the particular forms disclosed, but on the contrary, the specification is to cover all modifications, equivalents, and alternatives falling within the spirit and scope of the present embodiments as defined by the claims.

The terminology used herein is for the purpose of describing particular examples only and is not intended to be limiting of the present embodiments. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to other element, there are no intervening elements present. As used herein the term "and/or" includes any and all combinations of one or more of the associated listed items and may be abbreviated as"/".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the present embodiments.

Although some of the diagrams include arrows on communication paths to show a primary direction of communication, it is to be understood that communication may occur in the opposite direction to the depicted arrows.

Some examples are described with regard to block diagrams and operational flowcharts in which each block represents a circuit element, module, or portion of code which comprises one or more executable instructions for implementing the specified logical function(s). It should also be noted that in other implementations, the function(s) noted in the blocks may occur out of the order noted. For example, two blocks shown in succession may, in fact, be executed substantially concurrently or the blocks may sometimes be executed in the reverse order, depending on the functionality involved.

Reference herein to "in accordance with an example" or "in an example" means that a particular feature, structure, or characteristic described in connection with the example can be included in at least one implementation of the present embodiments. The appearances of the phrase in accordance with an example" or "in an example" in various places in the specification are not necessarily all referring to the same example, nor are separate or alternative examples necessarily mutually exclusive of other examples.

Reference numerals appearing in the claims are by way of illustration only and shall have no limiting effect on the scope of the claims.

While not explicitly described, the present examples and variants may be employed in any combination or subcombination.

In the following, the term "image region" designates a set of pixels of at least one image. These pixels may or not be adjacent pixels and/or belong or not of a same image but all of them share at least one common property.

For example, a whole image itself may be considered as being an image region. An image may also be split into multiple blocks and a block or a group of blocks is then an image region.

An image region may also have a non-rectangular shape. This is the case, for example, when pixels of an image which have a same (or similar) extracted feature are associated to form an image region. An image region may be a patch as defined in TMC2.

Examples of feature extracted from an image may be a color, texture, normal vector, etc. . . . . .

Some figures represent syntax tables widely used in TMC2 for defining the structure of a bitstream that conforms with TMC2. In those syntax tables, the term ' . . . ' denotes unchanged portions of the syntax with respect to the original definition given in TMC2 and removed in the figures to facilitate reading. Bold terms in figures indicate that a value for this term is obtained by parsing a bitstream. The right column of the syntax tables indicates the number of bits for encoding a data of a syntax element. For example, u(4) indicates that 4 bits are used for encoding a data, u(8) indicates 8 bits, ae(v) indicates a context adaptive arithmetic entropy coded syntax element.

The syntax elements as used herein, are descriptive terms. As such, they do not preclude the use of other syntax element names.

The present embodiments are described for encoding/decoding one or more geometry images and one or more attribute images representative of a point cloud but extends to the encoding/decoding of two sequences (video) of geometry images and two sequences (video) of attribute images representative of a sequence of point clouds (temporally dynamic point cloud) because the geometry (two geometry images) and attribute (two attribute images) of a point cloud of the sequence of point clouds is then encoded/decoded independently of the geometry (two geometry images) and attribute (two attribute images) of another point cloud of the sequence of point clouds.

When encoding and/or reconstructing a point cloud, data may be lost, which lead to a partial reconstruction of an input point cloud. Such loss of information may generate issues when rendering the input point cloud.

TMC2 provides good rate-distortion performance for lossy compression scenarios. However, the compression performance significantly degrades when lossless compression is needed because a high number of patches needs to be created to capture isolated (missing) points.

Other alternative encodes isolated points as a special patch without taking into account the potential correlation between these isolated points and those captured in "regular" patches (resulting of the projection of points onto a projection plane). The basic idea is to project a point cloud onto a projection plane by using TMC2, and to capture missing (isolated) points of the point cloud, i.e. points that are not represented by the geometry/attribute images. The X coordinate, followed by the Y and finally the Z coordinate of each missing/isolated point are stacked into a single vector and a "special" patch, denoted "missing-points" patch is generated. This patch is then stored in a single channel (component) of a 10 bit 4:2:0 geometry image (see ISO/IEC JTC1/SC29/WG11 MPEG2018/m42680 April 2018, San Diego, CA, USA, for more details).

This alternative limits the range of the coordinates of the missing points to a maximum range (1024 when the usual 10 bit 4:2:0 video format is used). This is emphasis because the coordinates of the missing/isolated points are stored as absolute values, i.e. the stored coordinates values are defined from the origin (0,0,0) of a bounding box bounding the point cloud.

Generally speaking, at least one embodiment relates to a method of encoding/reconstructing attributes of missing/isolated points, but the method may also apply to encode/reconstruct attributes of any other point of a point cloud. The method may thus be considered as being an alternative to an image-based point cloud compression technique such as TMC2, for encoding (and reconstructing) attributes of points of a point cloud. The method may also be considered as a mean for improving a lossy image-based point cloud compression techniques, such as TMC2, by providing lossless compression of a point cloud (encoding missing points).

The encoding method subdivides a bounding box bounding the points to be encoded, encodes data representative of attributes of a point by referring to a subdivision to which said point belongs to; and encode data representative of a number of points comprised in each subdivision.

The decoding method decodes encoded data representative of said attributes of points by referring to subdivisions to which the points belong to. Said subdivisions are subdivisions of a plurality of subdivisions obtained by splitting a bounding box bounding said points. The method further decodes encoded data representative of a number of points comprised in each subdivision of said bounding box; and reconstruct points from said decoded data.

Subdividing the bounding box bounding the points to be encoded and encoding data representative of attributes of a point by referring to a subdivision to which said point belong to, reduce number of bits requires to represent the attributes of the points. For example, the range of the coordinates values of those points may be reduced compared to the prior art because those coordinates may be defined from a reference point of a subdivision to which those points belong to and not from a reference point of the bounding box.

This invention allows lossless encoding of PointCloud image/video of any size independently of the bit depth of video coded with a video TMC2 point cloud encoder.

Figure 1:
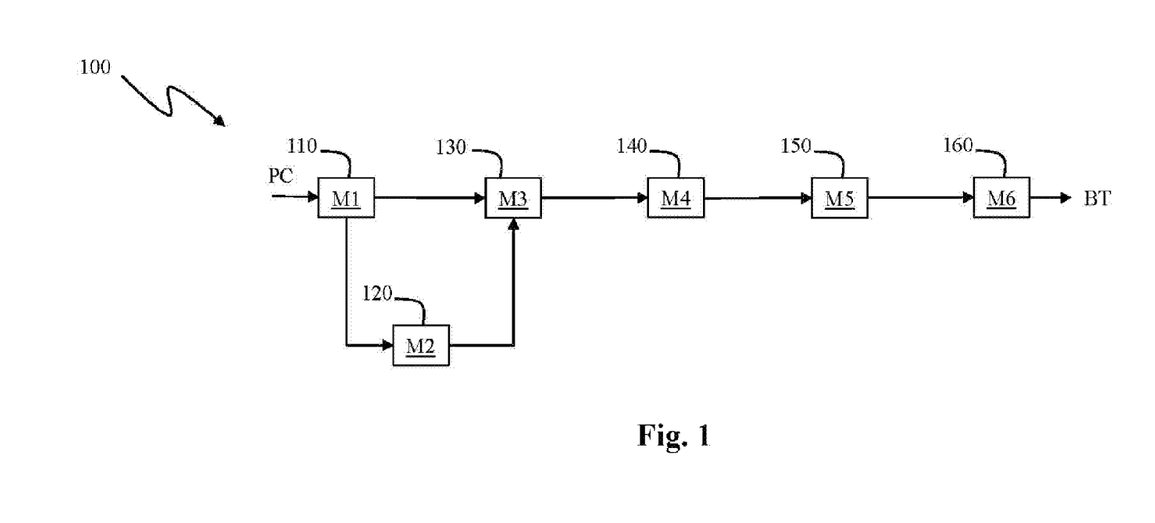
FIG. 1 shows schematically a diagram of the steps of the method 100 of encoding attributes of points of a point cloud in accordance with an example of the present embodiments.

FIG. 1 shows schematically a diagram of the operations of the method 100 for encoding attributes of at least some points of an input point cloud in accordance with an example of the present embodiments.

The operations may be part of a broader encoding process and may be implemented by the apparatus 13000 of FIG. 13.

In an operation 110, attributes of said points are encoded by an encoder M1. The attributes may correspond to geometry (or depth or distance to a view point) information and/or to texture (or color) information. For example, points are "clustered" as Connected Components as described in TMC2 (see TMC2) and encoded. For example, points of each connected component may be projected on a projection plane, the attributes of the projected points being stored in a so-called 2D patch (set of pixels) of at least one couple of a geometry and an attribute image. Metadata representative of the projection parameters used to obtain the 2D patches may be also encoded by the encoder M1. The encoder M1 is for example compliant with a legacy encoder such as:

JPEG, specification ISO/CEI 10918-1 UIT-T Recommendation T.81, https://www.itu.int/rec/T-REC-T.81/en, AVC, also named MPEG-4 AVC or h264. Specified in both UIT-T H.264 and ISO/CEI MPEG-4 Part 10 (ISO/CEI 14496-10), http://www.itu.int/rec/T-REC-H.264/en, HEVC (its specification is found at the ITU website, T recommendation, H series, h265, http://www.itu.int/rec/T-REC-H.265-201612-1/en), or 3D-HEVC (an extension of HEVC whose specification is found at the ITU website, T recommendation, H series, h265, http://www.itu.int/rec/T-REC-H.265-201612-1/en annex G and I).

In an operation 120, the data encoded with the encoder M1 is decoded by a decoder M2 and a point cloud is reconstructed from the decoded data, i.e. from the decoded attributes obtained from decoded at least one geometry/attribute images, and from metadata representative of the projection parameters, for example as explained in TMC2. The decoder M2 is compliant with the encoder M1, for example compliant with a legacy decoder such as:

JPEG,

AVC, also named MPEG-4 AVC or h264,

HEVC, or

3D-HEVC (an extension of HEVC).

In an operation 130 implemented by a module M3, the reconstructed point cloud is compared with the input point cloud. Missing points in the reconstructed point cloud and present in the input point cloud may be detected.

In an operation 140, a bounding box that bounds the missing points detected at operation 130 is subdivided into a plurality of subdivisions.

According to an embodiment, the bounding box bounding the missing points may correspond to the bounding box bounding the input point cloud.

According to an embodiment, the bounding box may correspond to a cube (or more generally a parallelogram) that is subdivided into a plurality of sub-cubes.

According to an embodiment, the subdivision of the bounding box may depend from a particular bit depth such as, for example, the bit depth of the encoder (8 bits/10 bits typically) used to encode points of the input point cloud and/or the missing points. Thus, the size and/or dimension of a subdivision (such as the side of a sub-cube) does not exceed said particular bit depth (may be expressed by using at most said maximum number of bits).

The method may thus be adapted to constraints (bit depth) of the encoder used for encoding the geometry and attribute images in TMC2.

According to an embodiment, the bounding box is split into sub-cubes using an octree-based method.

Basically, a cube is split into eight smaller sub-cubes recursively. Leaf cubes are marked occupied or not depending on whether there is at least one missing point in it.

In an embodiment, the octree depth is a constant value.

In a variant of this embodiment, a cube index is sent per sub-cube.

In a variant of this embodiment, the traversal order, e.g. depth-first or breadth first) is sent or assumed.

In a variant of this embodiment, the octree depth is sent.

In an embodiment, the octree depth is variable.

In a variant of this embodiment, the occupied leaves of splitting octree are sent.

In a variant of this embodiment, no index in missing point patch; patch metadata in the same order as traversal order.

In a variant, the depth of the octree depends on the bit-depth of the encoder used to encode the input point cloud and/or the missing points.

According to an embodiment, a clustering algorithm may be used to regroup the missing points inside sub-cubes minimizing the number of "missing-points" patches and/or minimizing the energy of coded missing points while respecting the limitation of then maximum size of the sub-cube depending on the input bit depth of video codec ($2^n$ with n equal to the bit depth). With this algorithm, the origin of the sub-cube is completely unrestricted. Minimizing the number of "missing-points" patches will decrease the bit-rate of the encoded.

In an operation 150, one or more 2D patches are obtained by a module M5. The one or more patches comprise data representative of the attributes of said each missing point.

According to one example, a single 2D patch is obtained.

According to another example, one 2D patch is obtained (or generated) for a subdivision of the bounding box when said subdivision comprises at least one of said missing points.

According to an embodiment, data representative of attributes of point belonging to a 2D patch relative to a subdivision is encoded as follows:

For each missing point, data representative of the attributes of this missing point is stored and associated with a pixel of a "missing-point" patch (single 2D patch or a 2D patch relative to a subdivision). This data may then be represented by referring to a reference point of the "missing-point" patch. For example, the coordinates of a missing point are represented by dX, dY and dZ differential coordinates calculated from a reference point of the subdivision that comprises the considered missing point. The dX coordinate, followed by the dY and finally the dZ coordinate of each missing point are stacked into a single vector. All the vectors generated for all the missing points that belong to said subdivision are then used to generate a "missing-points" patch.

Next, all "missing-points" patches (one per subdivision) are packed in a geometry image which thus comprises "regular" patches that represent attributes of at least some points of the input point cloud (step 110) and "missing-points" patches that represents attributes of missing points.

In an operation 160, the data representative of the attributes of the missing points is encoded by referring to the subdivisions to which the missing points belong to. Data representative of a number of missing points comprised in each subdivision may also be encoded by an encoder M6.

The following algorithm used for encoding data representative of the attributes of the missing points is given for illustrative purpose:

If the input point cloud to code is contained in one bounding box of size $2048^3$ and the video codec has a 10 bits depth (e.g. HEVC main10)

The bounding box may be split into 8 sub-cubes of size $1024^3$

For each sub-cube
If there is at least one missing point inside
Create a MissingPointsPatch object storing the sub-cube position in the bonding box
Update the origin of the sub-cube (u1,v1,d1)
Update the number of missing Points
Create a 2D patch MissingPointsPatch in the geometry image (packing algorithm)
Update the location in the geometry image (u0,v0) useful for the decoding process
Add sequentially the differential coordinates (dX,dY,dZ) of each missing point (X,Y,Z) in the geometry image:
dX=X−u1; dY=Y−v1; dZ=Z−d1;
Add sequentially the corresponding attribute (color components (R,G,B)) in an attribute image.

A bitstream BT is obtained. It comprises encoded data representative of the attributes of the missing points. Said encoded data refers to the subdivisions to which the missing points belong to. Possibly data representative of a number of missing points comprised in each subdivision is also encoded.

The bitstream BT may be transmitted, for example for decoding purpose and/or rendering of a reconstructed point cloud.

The encoding method of FIG. 1 may for example be incorporated into the encoding process according to TMC2.

Figure 2:
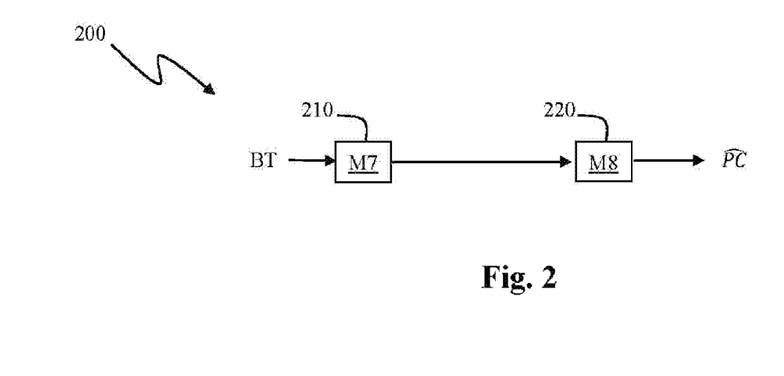
FIG. 2 shows schematically a diagram of the steps of the method 200 of decoding data representative of a point cloud from a bitstream in accordance with an example of the present embodiments.

FIG. 2 shows schematically a diagram of the operations of the method 200 of decoding attributes of points of a point cloud in accordance with an example of the present embodiments.

In an operation 210, a decoder M7 may decode encoded data comprises in a bitstream BT. The bitstream BT may be the output of the method of FIG. 1. Said encoded data are representative of the attributes of points.

The bitstream BT may also comprise encoded data representative of a number of points comprised in each subdivision of a plurality of subdivisions obtained by subdividing a bounding box bounding the points.

The decoder M7 may decode the number of points comprised in each subdivision and the encoded data representative of the attributes of points by referring to the subdivisions to which the points belong to.

The decoder M7 may correspond to the decoder M2 of FIG. 1 and is for example compliant with a legacy decoder such as:

JPEG,
AVC, also named MPEG-4 AVC or H264,
HEVC, or
3D-HEVC (an extension of HEVC).

In an operation 220 implemented by a module M8, at least a part of the input point cloud is reconstructed from decoded data obtained in the previous operation. The thus reconstructed point cloud $\widehat{PC}$ comprises at least missing points in a reconstructed version.

The decoding method of FIG. 2 may for example be incorporated into the decoding process according to TMC2.

According to an embodiment, missing points may be reconstructed from decoded data representative of attributes of missing points and by referring to subdivisions as follows:

A "missing-points" patch is decoded from a decoded geometry image. Then, a vector of coordinates relative to a missing point is obtained from a "missing-points" patch and the dX, dY, dZ coordinates relative to this missing point are retrieved from the vector.

The 3D coordinates (Xrec, Yrec, Zrec) of the missing point are then given by adding the dX, dY, dZ coordinates to the coordinates (u1, v1, z1) of a reference point of the "missing-points" patch (element of PatchList[i]):

$Xrec=dX+\text{PatchList}[i].u1$ $Yrec=dY+\text{PatchList}[i].v1$ $Zrec=dZ+\text{PatchList}[i].d1$ The associated attribute of the reconstructed point is obtained from an attribute image, for example as a pixel value located at (Xrec, Yrec).

According to an embodiment, a "missing-points" patch is obtained for a subdivision when said subdivision comprises at least one missing point.

According to an embodiment, the subdivision of a bounding box depends on a bit depth of a decoder used to decode the missing points.

According to an embodiment, attribute of a missing point corresponds to the geometry or texture/color information of said missing point.

Figure 3:
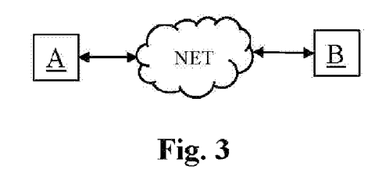
FIG. 3 shows two remote devices communicating over a communication network in accordance with an example of present embodiments.

According to an example of the present embodiments, illustrated in FIG. 3, in a transmission context between two remote devices A and B over a communication network NET, the device A comprises a processor in relation with memory RAM and ROM which are configured to implement a method as described in relation with the FIG. 1 and the device B comprises a processor in relation with memory RAM and ROM which are configured to implement a method as described in relation with FIG. 2.

In accordance with an example, the network is a broadcast network, adapted to broadcast still pictures or video pictures from a device A to decoding devices including the device B.

A signal, intended to be transmitted by the device A, carries the bitstream BT. The bitstream BT comprises coded data representing depth values of points of a point cloud, at least one reconstructed point of the point cloud, and at least one interpolation coding mode indicating how at least one point in a neighborhood of said at least one reconstructed point is approximated by at least one other interpolation point.

Said coded data are obtained, for example, as explained in relation with FIG. 1.

Figure 4:
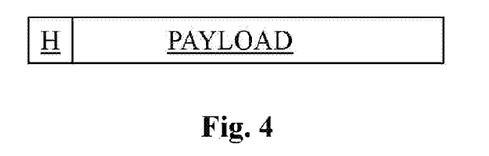
FIG. 4 shows the syntax of a signal in accordance with an example of present embodiments.

FIG. 4 shows an example of the syntax of such a signal when the data are transmitted over a packet-based transmission protocol. Each transmitted packet P comprises a header H and a payload PAYLOAD. Examples of syntax elements comprised in such a signal are given in TMC2.

In order to reconstruct the geometry (2D location) of a missing point, a decoder needs to know the reference point (typically its origin) of the subdivision (x1,y1,z1) and the number of missing points (num_of_mps) for each "missing-point" patch to reconstruct all these missing points.

Multiple syntax elements of TMC2 are used to carry encoded data needed for reconstructing missing points.

Figure 5:
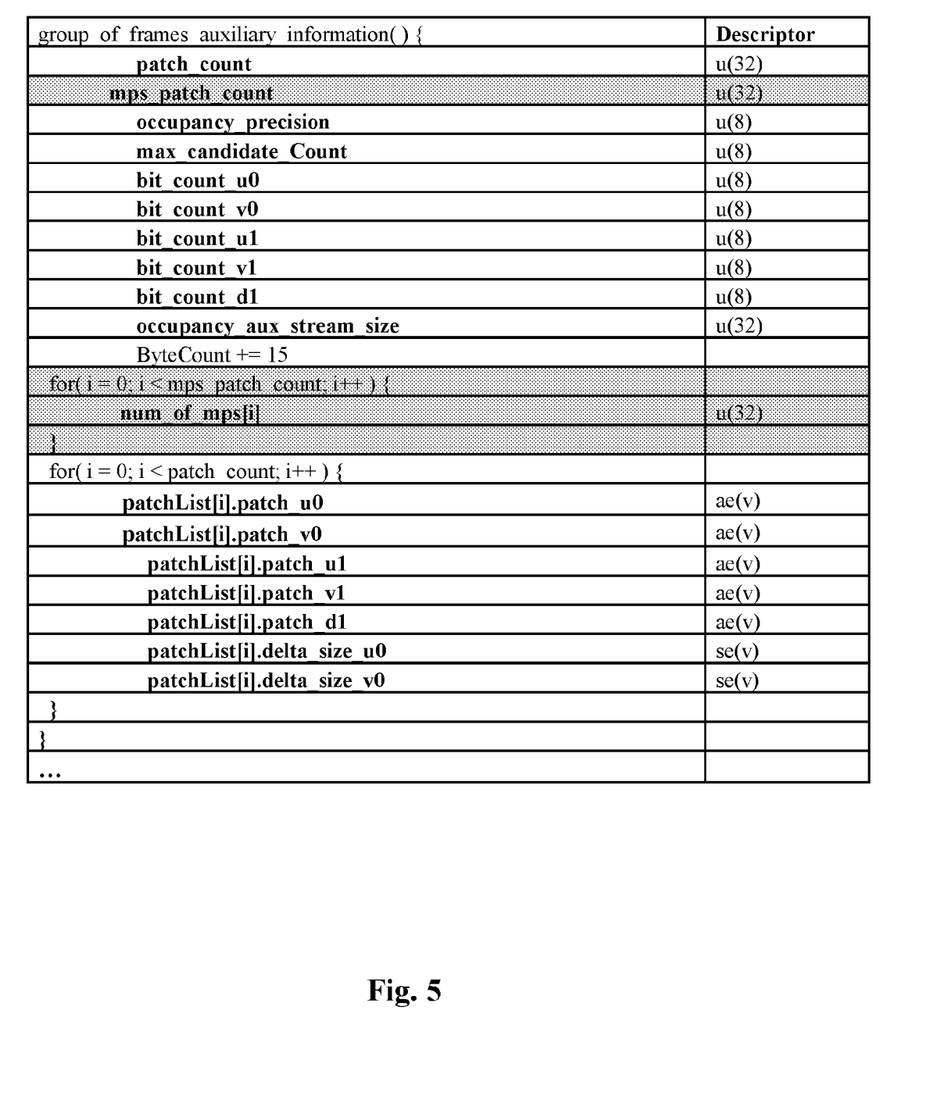
FIGS. 5-10 shows examples of syntax elements used to carry the information needed by the decoder to reconstruct missing points of a point cloud in accordance with an embodiment.

FIG. 5 shows an example of a syntax element used to carry the information needed by the decoder to reconstruct missing points of a point cloud in accordance with an embodiment.

This syntax element is based on the "group_of_frames_auxiliary_information" syntax element as defined in TMC2.

A syntax element patch_count indicates a total number of patches including the "missing point" patches. A syntax element mps_patch_count indicate the number of "missing-point" patches in a geometry image and the syntax element num_of_mps[i] is also added to indicate the number of missing points in each "missing points" patches i. The last patches in the geometry image (from "patch_count-mps_patch_count) are "missing point" patches.

Figure 6:
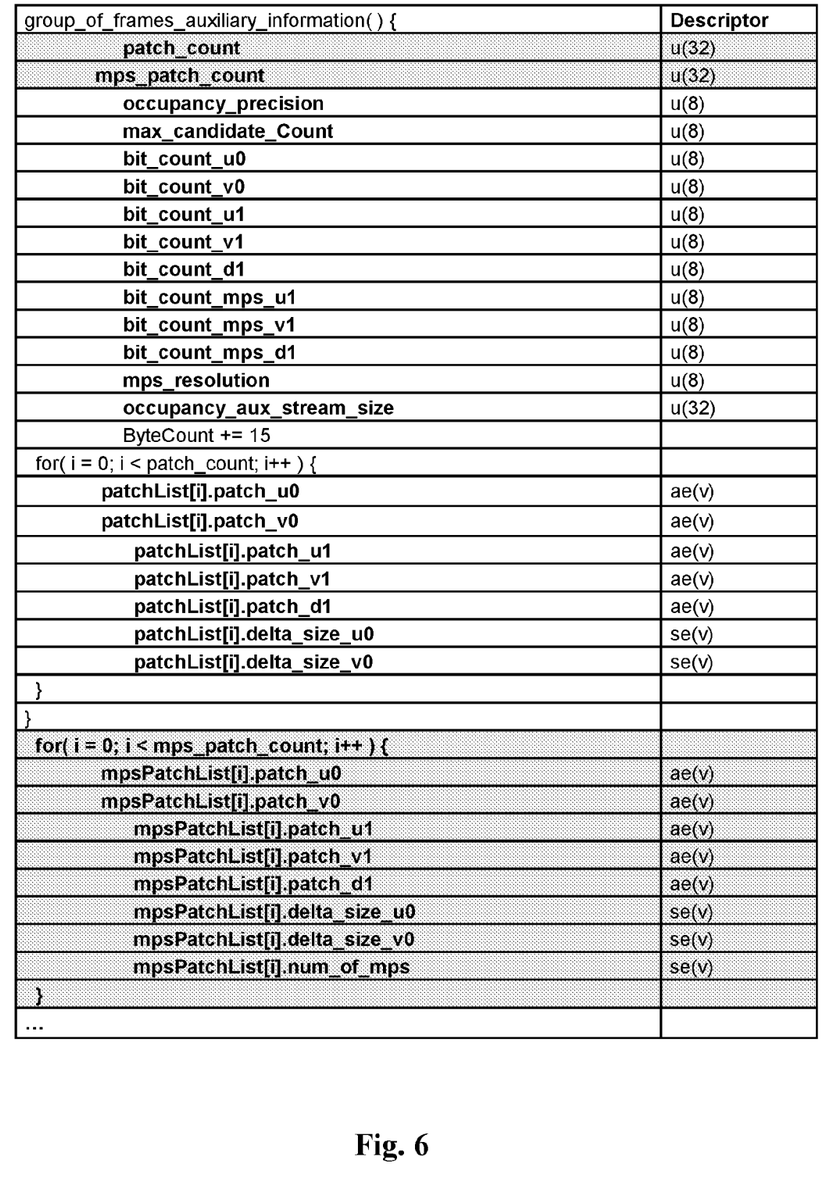

FIG. 6 shows an example of a syntax element used to carry the information needed by the decoder to reconstruct all missing points of a point cloud in accordance with an embodiment.

This syntax element is based on the "group_of_frames_auxiliary_information" syntax element as defined in TMC2.

In the embodiment, the last patches are "missing point" patches in a geometry image.

A syntax element patch_count indicates a total number of patches excluding the "missing point" patches. A syntax element mps_patch_count indicates the number of "missing-point" patches in a geometry image and the syntax element num_of_mps[i] is also added to indicate the number of missing points in each "missing points" patches i. The last patches in the geometry image (from "patch_count-mps_patch_count) are "missing point" patches.

Figure 7:
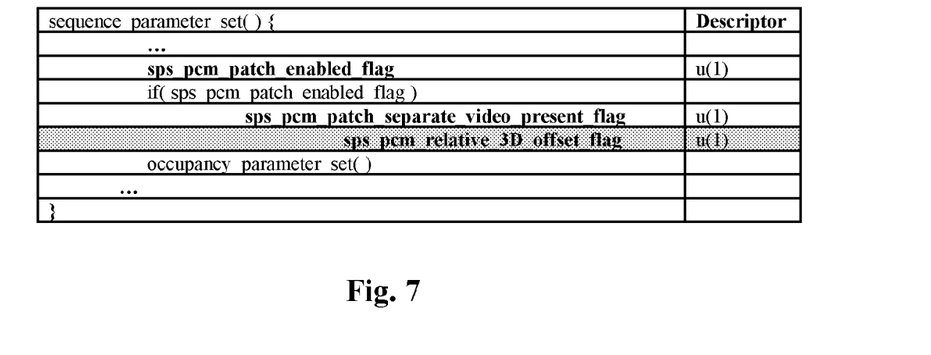

FIG. 7 shows an example of a syntax element used to carry the information needed by the decoder to reconstruct missing points of a point cloud in accordance with an embodiment.

This syntax element is based on the "sequence parameter set" syntax element as defined in TMC2.

A syntax element sps_pcm_multiple_patch_present_flag indicates whether Multiple PCM patches is used.

A syntax element sps_pcm_relative_3D_offset indicates if the 3D offset is transmitted in the PCM patch syntax in absolute or in relative. The value 0 indicates the absolute mode, the value 1 indicates the relative mode (the offset values are coded with one index).

A syntax element sps_pcm_relative_3D_offset indicates the maximum number of PCM patches. This value is used for encoding PCM patch index when the mode sps_pcm_relative_3D_offset_flag is set to 1.

Figure 8:
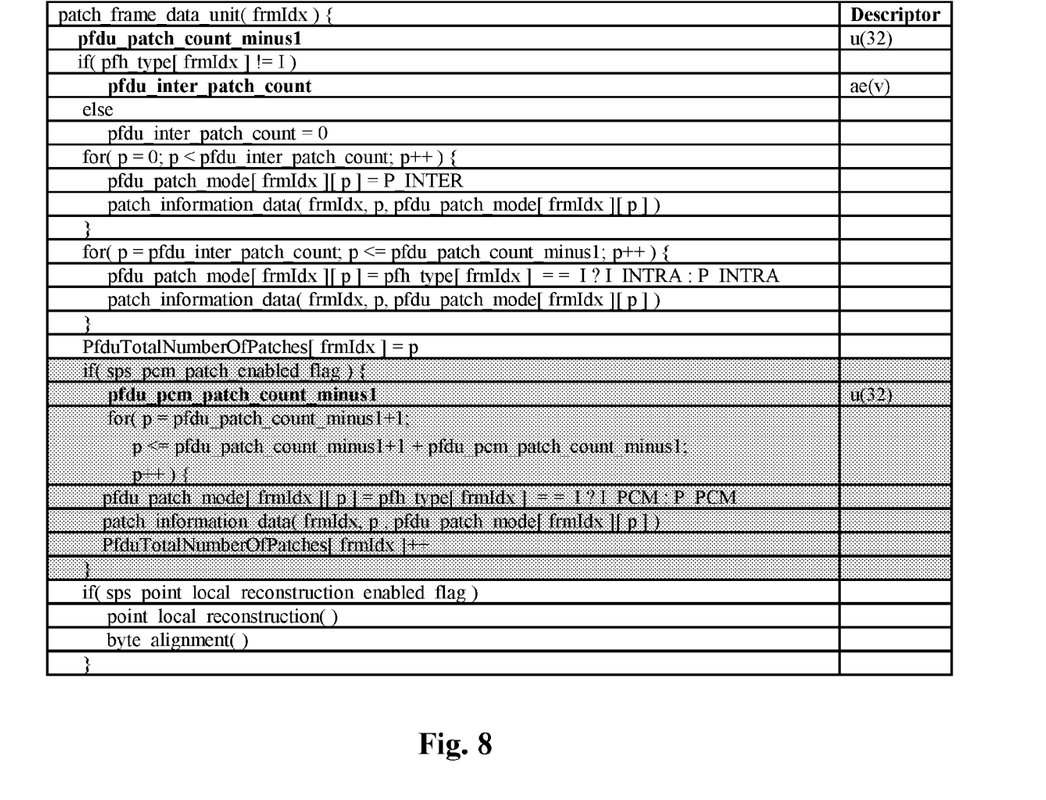

FIG. 8 shows an example of a syntax element used to carry the information needed by the decoder to reconstruct missing points of a point cloud in accordance with an embodiment.

This syntax element is based on the "patch_frame_data_unit" syntax element as defined in TMC2.

The added syntax (grey shaded areas) adds the parsing of an additional type of patch data unit, used to signal the presence of the EOM texture patch.

Figure 9:
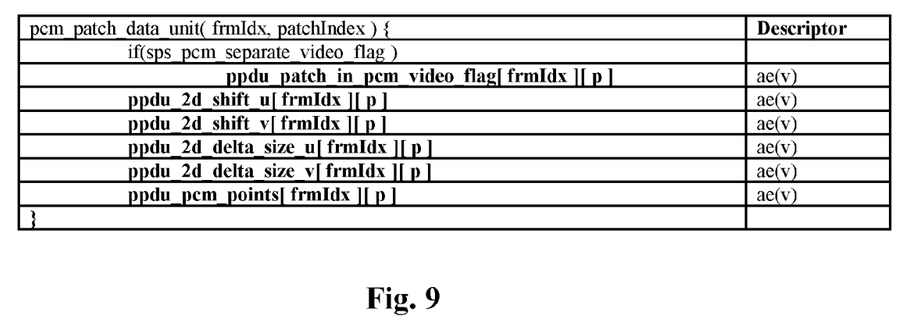

FIG. 9 shows an example of a syntax element used to carry the information needed by the decoder to reconstruct missing points of a point cloud in accordance with an embodiment.

This syntax element is based on the "pcm_patch_data_unit" syntax element as defined in TMC2.

Figure 10:
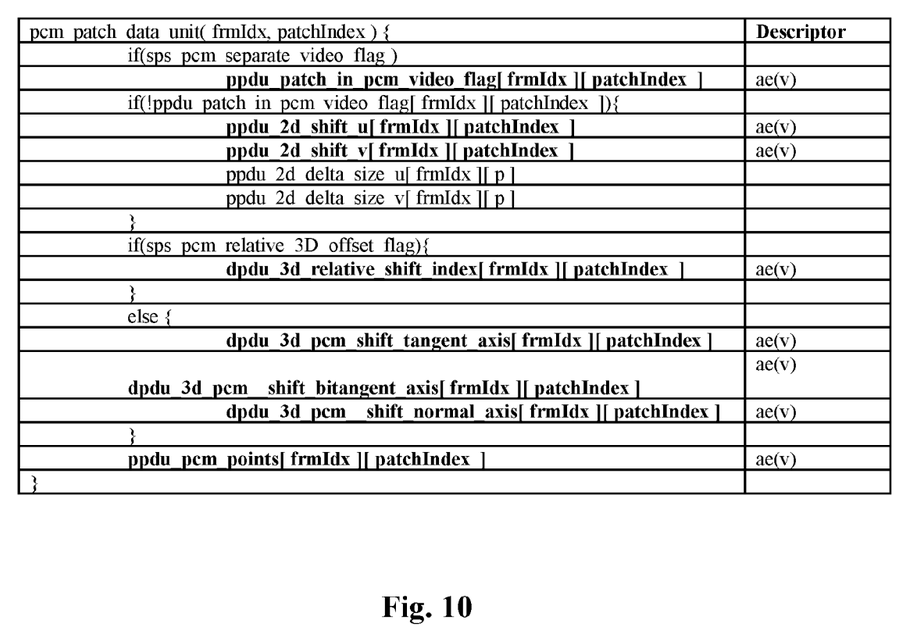

FIG. 10 shows an example of a syntax element used to carry the information needed by the decoder to reconstruct missing points of a point cloud in accordance with an embodiment.

This syntax element is based on the "pcm_patch_data_unit" syntax element as defined in TMC2.

The additional data are introduced:

pdu_3d_pcm_shift_tangent_axis[frmIdx][patchIndex] specifies the shift to be applied to the reconstructed PCM patch points in patch with index p of patch frame frmIdx along the tangent axis. The value of pdu_3d_shift_tangent_axis[frmIdx][p] shall be in the range of 0 to $\text{Min}(2^{pfh\_3d\_shift\_tangent\_axis\_bit\_count\_minus1[frmIdx]+1}, 2^{sps\_geometry\_3d\_coordinates\_bitdepth\_minus1+1}-1)$, inclusive.

pdu_3d_pcm_shift_bitangent_axis[frmIdx][patchIndex] specifies the shift to be applied to the PCM reconstructed patch points in patch with index p of patch frame frmIdx along the bitangent axis. The value of pdu_3d_shift_bitangent_axis[frmIdx][patchIndex] shall be in the range of 0 to Min ($2^{pfh\_3d\_shift\_bitangent\_axis\_bit\_count\_minus1[frmIdx]+1}$, $2^{gps\_geometry\_3d\_coordinates\_bitdepth\_minus1+1}-1$), inclusive.

pdu_3d_pcm_shift_normal_axis[frmIdx][patchIndex] specifies the shift to be applied to the PCM reconstructed patch points in patch with index p of patch frame frmIdx along the normal axis. The value of pdu_3d_shift_normal_axis[frmIdx][patchIndex] shall be in the range of 0 to Min ($2^{pfh\_3d\_shift\_normal\_axis\_bit\_count\_minus1[frmIdx]+1}$, $2^{gps\_geometry\_3d\_coordinates\_bitdepth\_minus1+1}-1$), inclusive.

dpdu_3d_relative_shift_index[frmIdx][patchIndex] specifies the index that allows to compute the three 3D shift values (tangent, bitangent and normal). A decoding process of this index, described in xxxxx, computes the 3 following parameters     pdu_3d_pcm_shift_tangent_axis[frmIdx][p]
    pdu_3d_pcm_shift_bitangent_axis[frmIdx][p]
    pdu_3d_pcm_shift_normal_axis[frmIdx][p]

According to an embodiment, the encoding method may generate one additional patch, the OEM texture patch representing the attribute of missing points. This patch may be packed in an attribute image. Patch information for said additional patch may also be encoded.

According to an embodiment, the decoding method may obtain an OEM texture patch following one of the syntax above described. Attribute of missing points may be obtained from said EOM texture patch according to the parameters in the EOM texture patch (and eventually fixed parameters like sorting and rasterization modes).

According to an embodiment, a dpdu_3d_relative_shift_index is decoded as follows:
Inputs to this process are:
    dpdu_3d_relative_shift_index
    gps_geometry_nominal_2d_bitdepth_minus1 from geometry_parameter_set( )
    gps_geometry_3d_coordinates_bitdepth_minus1 from geometry_parameter_set( )
Output of this process:
    pdu_3d_pcm_shift_tangent_axis
    pdu_3d_pcm_shift_bitangent_axis
    pdu_3d_pcm_shift_normal_axis The dpdu_3d_relative_shift_index specifies the index to be decoded. The gps_geometry_nominal_2d_bitdepth_minus1 indicates the nominal 2D bit depth to which all geometry videos shall be converted to. gps_geometry_nominal_2d_bitdepth_minus1 shall be in the range of 0 to 31, inclusive. The gps_geometry_3d_coordinates_bitdepth_minus1 indicates the bit depth of the geometry coordinates of the reconstructed point cloud. gps_geometry_3d_coordinates_bitdepth_minus1 shall be in the range of 0 to 31, inclusive.

The bounding box of the reconstructed point cloud may be split into a set of sub-cubes. Each sub-cube is indexed by one index. The result of the decoding of this index give the 3D position of each sub-cube (3D PCM box).

The size of the bounding box of the reconstructed point cloud may be given bit depth of the 3D coordinates of the reconstructed point cloud parameter (gps_geometry_3d_coordinates_bitdepth_minus1).

The size of the 3D PCM box may be given by the bit depth of the geometry video parameter (gps_geometry_nominal_2d_bitdepth_minus1).

The side of the 3D PCM box is equal to $2^{gps\_geometry\_nominal\_bitdepth\_minus1+1}$.

So, the difference between gps_geometry_3d_coordinates_bitdepth_minus1 and gps_geometry_nominal_2d_bitdepth_minus1 indicates the number of 3D positions index in one 3D axe.

$n$=gps_geometry_3d_coordinates_bitdepth_minus1− gps_geometry_nominal_2d_bitdepth_minus1;

pdu_3d_pcm_shift_normal_axis= (dpdu_3d_relative_shift_index & $2n-1$)*2gps_geometry_nominal_bitdepth_minus1;

pdu_3d_pcm_shift_tangent_axis= (dpdu_3d_relative_shift_index &($2n-1$)<<($2n-1$))*2gps_geometry_nominal_bitdepth_minus1 pdu_3d_pcm_shift_bitangent_axis= (dpdu_3d_relative_shift_index & 2*($2n-1$)<< ($2n-1$))*2gps_geometry_nominal_bitdepth_minus1+1

Example:

gps_geometry_3d_coordmates_bitdepth_minus1=14;

2gps_geometry_nominal_bitdepth_minus1=10;

pdu_3d_pcm_shift_normal_axis=(index & 0x000f)*1024);

pdu_3d_pcm_shift_tangent_axis=(index & 0x00f0)*1024);

pdu_3d_pcm_shift_bitangent_axis=(index & 0x0f00)*1024);

In this example each 3D coordinate is coded with 4 bits.
The index value equal to 0x0123 gives the following result:

pdu_3d_pcm_shift_normal_axis=3*1024=3072;

pdu_3d_pcm_shift_tangent_axis=2*1024=2048, pdu_3d_pcm_shift_bitangent_axis=1*1024=1024;

According to an embodiment, points of a point cloud are reconstructed from PCM coded patches as follow.
Inputs to this process are:
    gFrame, the decoded geometry frame
    aFrame, the decoded attributeframe
    recPc, the container for holding the list of points in the reconstructed point cloud.
    pointsAdded, a variable to indicate the number of points already added to the list of points in the reconstructed point cloud.
    patch, a patch from which points are to be retrieved and added to the list of points in the reconstructed point cloud (the process assumes that the input patch is the PCM coded patch).
Output of this process is losslessly reconstructed point cloud in recPC.
First, the patch information is retrieved as follows:

pdu_2d_shift_u=patch.pdu_2d_shift_u pdu_2d_shift_v=patch.pdu_2d_shift_v

Patch2dSizeU=patch.pdu_3d_shift_tangent_axis− patch.pdu_2d_shift_u Patch2dSizeV=patch.*pdu_3d_shift_bitangent_axis*−
patch.*pdu_2d_shift_v* occupancyResolution=patch.occupancy_resolution

If lossless_geometry_444 flag is equal to 0, then, the points are retrieved from the PCM coded patch stored in the geometry frame using 4:4:4 format as specified in clause 3.3.1.1 of TMC2.

Retrieval of points from PCM coded patches stored in a 4:4:4 geometry frame Points from a PCM coded patch are retrieved and added to the reconstructed point cloud as follows:

```
3d_pcm_shift [0] = pdu_3d_pcm_shift_tangent_axis
3d_pcm_shift [1] = pdu_3d_pcm_shift_bitangent_axis
3d_pcm_shift [2] = pdu_3d_pcm_shift_normal_axis
for( x = Patch2dShiftU ; x < Patch2dShiftU + Patch2dSizeU; x++ )
    for( y = Patch2dShiftV ; y < Patch2dShiftV + Patch2dSizeV; y++ )
        if( oFrame[ y ][ x ] != 0 ) {
            for( i = 0; i < 3; i++ )
                point[ i ] = gFrame[ 0 ][ i ][ y ][ x ] + 3d_pcm_shift
                [i]
        }
```

Figure 11:
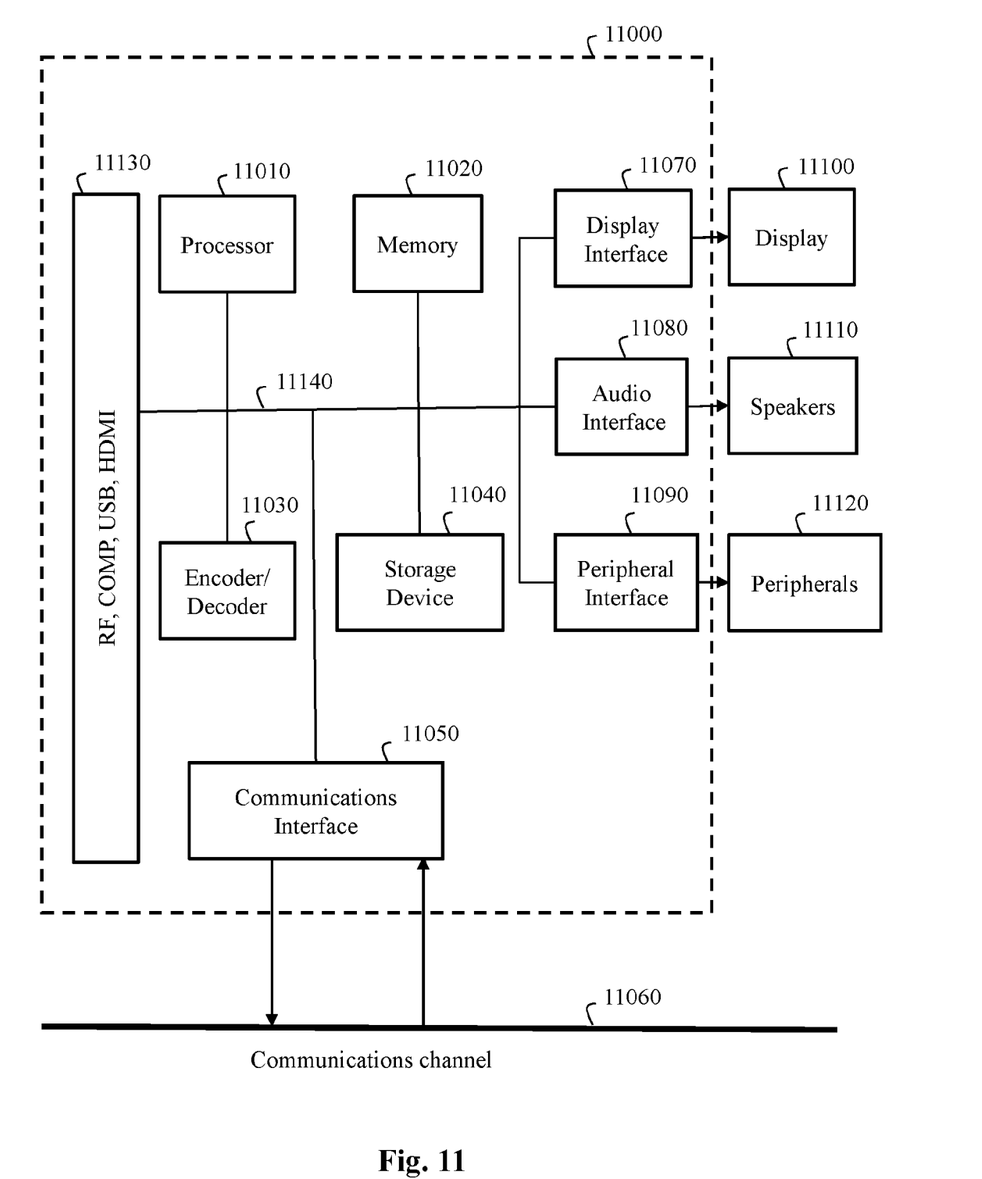
FIG. 11 illustrates a block diagram of an example of a system in which various aspects and embodiments are implemented in accordance with an example of present embodiments.

FIG. 11 illustrates a block diagram of an example of a system in which various aspects and embodiments are implemented. System 11000 can be embodied as a device including the various components described below and is configured to perform one or more of the aspects described in this application. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 11000, singly or in combination, can be embodied in a single integrated circuit, multiple ICs, and/or discrete components. For example, in at least one embodiment, the processing and encoder/decoder elements of system 11000 are distributed across multiple ICs and/or discrete components. In various embodiments, the system 11000 is communicatively coupled to other similar systems, or to other electronic devices, via, for example, a communications bus or through dedicated input and/or output ports. In various embodiments, the system 11000 is configured to implement one or more of the aspects described in this document.

The system 11000 includes at least one processor 11010 configured to execute instructions loaded therein for implementing, for example, the various aspects described in this document. Processor 11010 can include embedded memory, input output interface, and various other circuitries as known in the art. The system 11000 includes at least one memory 11020 (e.g., a volatile memory device, and/or a non-volatile memory device). System 11000 includes a storage device 11040, which can include non-volatile memory and/or volatile memory, including, but not limited to, EEPROM, ROM, PROM, RAM, DRAM, SRAM, flash, magnetic disk drive, and/or optical disk drive. The storage device 11040 can include an internal storage device, an attached storage device, and/or a network accessible storage device, as non-limiting examples. System 11000 includes an encoder/decoder module 11030 configured, for example, to process data to provide an encoded video or decoded video, and the encoder/decoder module 11030 can include its own processor and memory. The encoder/decoder module 11030 represents module(s) that can be included in a device to perform the encoding and/or decoding functions. As is known, a device can include one or both of the encoding and decoding modules. Additionally, encoder/decoder module 11030 can be implemented as a separate element of system 11000 or can be incorporated within processor 11010 as a combination of hardware and software as known to those skilled in the art.

Program code to be loaded onto processor 11010 or encoder/decoder 11030 to perform the various aspects described in this document can be stored in storage device 11040 and subsequently loaded onto memory 11020 for execution by processor 11010. In accordance with various embodiments, one or more of processor 11010, memory 11020, storage device 11040, and encoder/decoder module 11030 can store one or more of various items during the performance of the processes described in this document. Such stored items can include, but are not limited to, the input video, the decoded video, the point cloud, the reconstructed point cloud or portions of the decoded video, the bitstream, matrices, variables, and intermediate or final results from the processing of equations, formulas, operations, and operational logic.

In several embodiments, memory inside of the processor 11010 and/or the encoder/decoder module 11030 is used to store instructions and to provide working memory for processing that is needed during encoding or decoding.

In other embodiments, however, a memory external to the processing device (for example, the processing device can be either the processor 11010 or the encoder/decoder module 11030) is used for one or more of these functions. The external memory can be the memory 11020 and/or the storage device 11040, for example, a dynamic volatile memory and/or a non-volatile flash memory. In several embodiments, an external non-volatile flash memory is used to store the operating system of a television. In at least one embodiment, a fast external dynamic volatile memory such as a RAM is used as working memory for video coding and decoding operations, such as for MPEG-2, HEVC, VVC (Versatile Video Coding) or TMC2.

The input to the elements of system 11000 can be provided through various input devices as indicated in block 11130. Such input devices include, but are not limited to, (i) an RF portion that receives an RF signal transmitted, for example, over the air by a broadcaster, (ii) a Composite input terminal, (iii) a USB input terminal, and/or (iv) an HDMI input terminal.

In various embodiments, the input devices of block 11130 have associated respective input processing elements as known in the art. For example, the RF portion can be associated with elements necessary for (i) selecting a desired frequency (also referred to as selecting a signal, or band-limiting a signal to a band of frequencies), (ii) down-converting the selected signal, (iii) band-limiting again to a narrower band of frequencies to select (for example) a signal frequency band which can be referred to as a channel in certain embodiments, (iv) demodulating the down-converted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, down-converting the received signal to a lower frequency (for example, an intermediate frequency or a near-baseband frequency) or to baseband.

In one set-top box embodiment, the RF portion and its associated input processing element receives an RF signal transmitted over a wired (for example, cable) medium, and performs frequency selection by filtering, down-converting, and filtering again to a desired frequency band.

Various embodiments rearrange the order of the above-described (and other) elements, remove some of these elements, and/or add other elements performing similar or different functions.

Adding elements can include inserting elements in between existing elements, such as, for example, inserting amplifiers and an analog-to-digital converter. In various embodiments, the RF portion includes an antenna.

Additionally, the USB and/or HDMI terminals can include respective interface processors for connecting system 11000 to other electronic devices across USB and/or HDMI connections. It is to be understood that various aspects of input processing, for example, Reed-Solomon error correction, can be implemented, for example, within a separate input processing IC or within processor 11010 as necessary. Similarly, aspects of USB or HDMI interface processing can be implemented within separate interface ICs or within processor 11010 as necessary. The demodulated, error corrected, and demultiplexed stream is provided to various processing elements, including, for example, processor 11010, and encoder/decoder 11030 operating in combination with the memory and storage elements to process the data stream as necessary for presentation on an output device.

Various elements of system 11000 can be provided within an integrated housing. Within the integrated housing, the various elements can be interconnected and transmit data therebetween using suitable connection arrangement, for example, an internal bus as known in the art, including the I2C bus, wiring, and printed circuit boards.

The system 11000 includes communication interface 11050 that enables communication with other devices via communication channel 11060. The communication interface 11050 can include, but is not limited to, a transceiver configured to transmit and to receive data over communication channel 11060. The communication interface 11050 can include, but is not limited to, a modem or network card and the communication channel 11060 can be implemented, for example, within a wired and/or a wireless medium.

Data is streamed to the system 11000, in various embodiments, using a Wi-Fi network such as IEEE 802.11. The Wi-Fi signal of these embodiments is received over the communications channel 11060 and the communications interface 11050 which are adapted for Wi-Fi communications. The communications channel 11060 of these embodiments is typically connected to an access point or router that provides access to outside networks including the Internet for allowing streaming applications and other over-the-top communications.

Other embodiments provide streamed data to the system 11000 using a set-top box that delivers the data over the HDMI connection of the input block 11130.

Still other embodiments provide streamed data to the system 11000 using the RF connection of the input block 11130.

The system 11000 can provide an output signal to various output devices, including a display 11100, speakers 11110, and other peripheral devices 11120. The other peripheral devices 11120 include, in various examples of embodiments, one or more of a stand-alone DVR, a disk player, a stereo system, a lighting system, and other devices that provide a function based on the output of the system 11000.

In various embodiments, control signals are communicated between the system 11000 and the display 11100, speakers 11110, or other peripheral devices 11120 using signaling such as AV.Link, CEC, or other communications protocols that enable device-to-device control with or without user intervention.

The output devices can be communicatively coupled to system 11000 via dedicated connections through respective interfaces 11070, 11080, and 11090.

Alternatively, the output devices can be connected to system 11000 using the communications channel 11060 via the communications interface 11050. The display 11100 and speakers 11110 can be integrated in a single unit with the other components of system 11000 in an electronic device such as, for example, a television.

In various embodiments, the display interface 11070 includes a display driver, such as, for example, a timing controller (T Con) chip.

The display 11100 and speaker 11110 can alternatively be separate from one or more of the other components, for example, if the RF portion of input 11130 is part of a separate set-top box. In various embodiments in which the display 11100 and speakers 11110 are external components, the output signal can be provided via dedicated output connections, including, for example, HDMI ports, USB ports, or COMP outputs.

Implementations of the various processes and features described herein may be embodied in a variety of different equipment or applications. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and any other device for processing a picture or a video or other communication devices. As should be clear, the equipment may be mobile and even installed in a mobile vehicle.

Additionally, the methods may be implemented by instructions being performed by a processor, and such instructions (and/or data values produced by an implementation) may be stored on a computer readable storage medium. A computer readable storage medium can take the form of a computer readable program product embodied in one or more computer readable medium(s) and having computer readable program code embodied thereon that is executable by a computer. A computer readable storage medium as used herein is considered a non-transitory storage medium given the inherent capability to store the information therein as well as the inherent capability to provide retrieval of the information therefrom. A computer readable storage medium can be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present embodiments can be applied, is merely an illustrative and not exhaustive listing as is readily appreciated by one of ordinary skill in the art: a portable computer diskette; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

The instructions may form an application program tangibly embodied on a processor-readable medium.

Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described example of the present embodiments, or to carry as data the actual syntax-values written by a described example of the present embodiments. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method comprising:
subdividing a bounding box bounding points of a point cloud into multiple subdivisions; and
encoding data representative of attributes of at least one point of the point cloud by referring to a subdivision to which said at least one point belongs, wherein 3D coordinates of the at least one point of the subdivision are encoded as differential coordinates obtained from coordinates of a reference point of the subdivision in a patch encoded in a geometry image.

2. The method of claim 1, wherein the method further comprises encoding data representative of a number of points comprised in each subdivision.

3. The method of claim 1, wherein the subdivision of said bounding box depending on a bit depth of an encoder used to encode the points.

4. The method of claim 1, wherein attribute of a point corresponds to the geometry or texture or color information of said point.

5. A method comprising:
decoding data representative of attributes of points of a point cloud by referring to a subdivision to which the points belong, said subdivision being one of a plurality of subdivisions obtained by splitting a bounding box bounding said points of the point cloud; and
reconstructing attributes of at least one point of the point cloud from said decoded data comprising obtaining a patch for the subdivision from a decoded geometry image, and obtaining 3D coordinates of the at least one point from coordinates obtained from pixel values of the patch and coordinates of a reference point of the patch.

6. The method of claim 5, wherein the method further comprises decoding data representative of a number of points comprised in each subdivision of said bounding box, and reconstructing attributes of points further from said number of points.

7. The method of claim 5, wherein attributes of points are reconstructed from said decoded data reconstructing points of the reconstructed point cloud by decoding at least one geometry image and at least one attribute image.

8. The method of claim 5, wherein the method further comprises obtaining a patch for a subdivision when said subdivision comprises at least one of said points.

9. The method of claim 5, wherein the subdivision of said bounding box depending on a bit depth of a decoder used to decode the points.

10. The method of claim 5, wherein attribute of a point corresponds to the geometry or texture or color information of said point.

11. An apparatus comprising a processor configured to:
subdividing a bounding box bounding points of a point cloud into multiple subdivisions; and
encoding data representative of attributes of a point of the point cloud by referring to a subdivision to which said point belongs, wherein 3D coordinates of the point of the subdivision are encoded as differential coordinates obtained from coordinates of a reference point of the subdivision in a patch encoded in a geometry image.

12. The apparatus of claim 11, wherein the subdivision of said bounding box depending on a bit depth of an encoder used to encode the points.

13. A apparatus comprising a processor configured to:
decode data representative of attributes of points of a point cloud by referring to a subdivision to which the points belong, said subdivision being one of a plurality of subdivisions obtained by splitting a bounding box bounding said points of the point cloud; and
reconstruct attributes of at least one point of the point cloud from said decoded data comprising obtaining a patch for the subdivision from a decoded geometry image, and obtaining 3D coordinates of the at least one point from coordinates obtained from pixel values of the patch and coordinates of a reference point of the patch.

14. The apparatus of claim 13, wherein the processor is further configured to:
decode data representative of a number of points comprised in each subdivision of said bounding box, and reconstructing attributes of points further from said number of points.

15. The apparatus of claim 13, wherein attributes of points are reconstructed from said decoded data reconstructing points of the reconstructed point cloud by decoding at least one geometry image and at least one attribute image.

16. The apparatus of claim 13, wherein the subdivision of said bounding box depending on a bit depth of a decoder used to decode the points.

17. A non-transitory computer-recordable medium comprising a bitstream comprising encoded data representative of attributes of points of a point cloud, said encoded data referring to subdivisions to which the points belong, said subdivisions being obtained by splitting a bounding box bounding said points, wherein 3D coordinates of at least one point of a subdivision are encoded in said encoded data as differential coordinates obtained from coordinates of a reference point of the subdivision in a patch encoded in a geometry image.

18. A non-transitory computer-readable medium including instructions for causing one or more processors to perform:

decoding data representative of attributes of points of a point cloud by referring to a subdivision to which the points belong, said subdivision being one of a plurality of subdivisions obtained by splitting a bounding box bounding said points of the point cloud; and reconstructing attributes of at least one point of the point cloud from said decoded data comprising obtaining a patch for the subdivision from a decoded geometry image, and obtaining 3D coordinates of the at least one point from coordinates obtained from pixel values of the patch and coordinates of a reference point of the patch.

\* \* \* \* \*